Oct. 5, 1965 G. R. ANDERSON, JR 3,209,434
METHOD OF ASSEMBLING AN ELECTRIC MOTOR
Original Filed Jan. 23, 1961 2 Sheets-Sheet 1
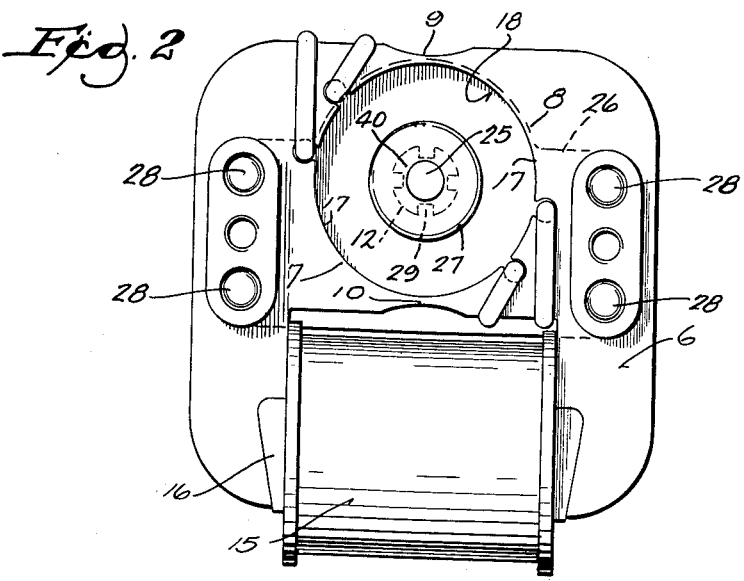
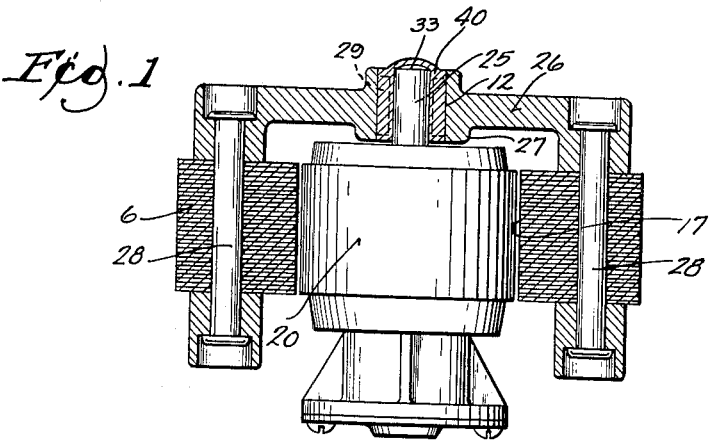
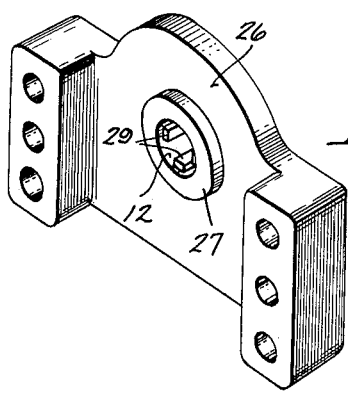
INVENTOR.
GORDON R. ANDERSON, JR
BY
Wheeler, Wheeler & Wheeler
ATTORNEYS Oct. 5, 1965
G. R. ANDERSON, JR
3,209,434
METHOD OF ASSEMBLING AN ELECTRIC MOTOR
Original Filed Jan. 23, 1961
2 Sheets-Sheet 2
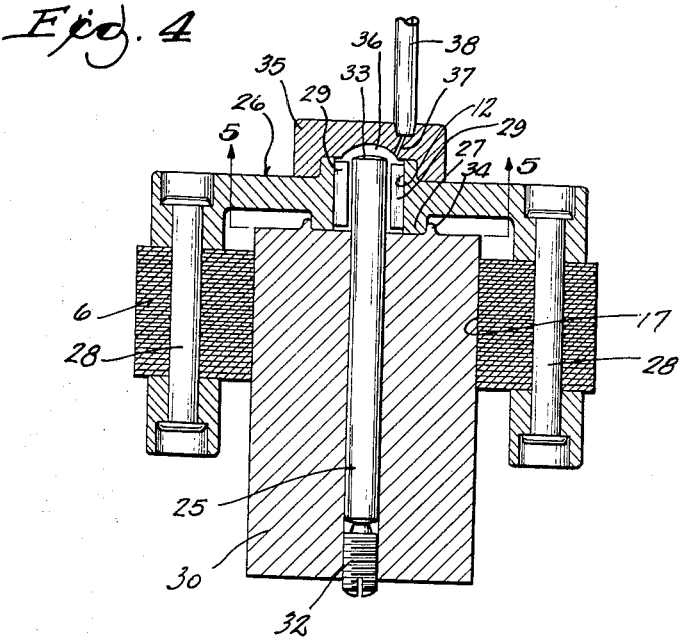
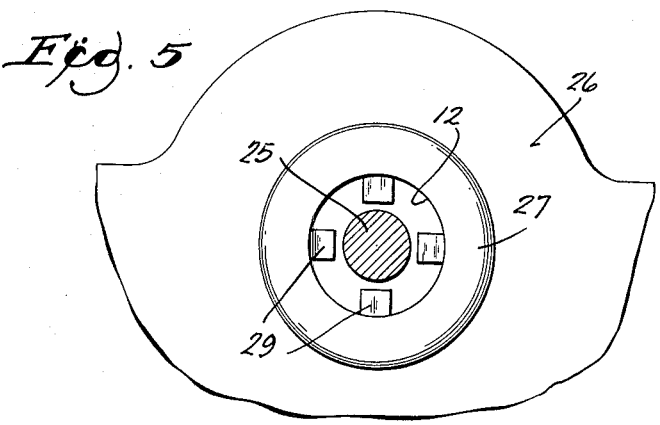
INVENTOR.
GORDON R. ANDERSON, JR
BY
Wheeler, Wheeler, Wheeler
ATTORNEYS

United States Patent Office 3,209,434
Patented Oct. 5, 1965

3,209,434
METHOD OF ASSEMBLING AN ELECTRIC MOTOR
Gordon R. Anderson, Jr., Racine, Wis., assignor to Howard Industries, Inc., Racine, Wis., a corporation of Wisconsin
Original application Jan. 23, 1961, Ser. No. 84,410. Divided and this application Jan. 8, 1962, Ser. No. 164,661
3 Claims. (Cl. 29—155.5)

This invention relates to a method of assembling an electric motor.

The present application is a division made pursuant to requirement for restriction in application 84,410 filed January 23, 1961 and entitled Rotor Shaft Bearing and Method of Manufacture Thereof.

The invention is exemplified in the disclosed embodiment, which is an improvement upon U.S. Patent No. 2,904,709. The construction is one in which the rotor is rotatable upon a stationary shaft. The shaft is supported at one end only on a non-magnetic bracket spanning a cylindrical bore in the stator field laminations. The bore is defined by cylindrically finished polar portions of the stator extending into close proximity to the rotor at opposite sides of the bore. The rotor may or may not be an armature of an electric motor.

It has always been very difficult to locate the shaft directly upon and exactly aligned with the axis of the bore. In a motor, the rotor should be at the center of the said cylindrical field pole surfaces. The slightest offset or tilt of the shaft subjects the rotor to varying magnetic action which results in vibration and bearing wear and noise. In the past, the shaft has been pressed to a driven fit in a hole provided in the bracket. Any mechanical error in the formation of the bracket, or its attachment to the stator laminations, or in the location of the angle of the hole in the bracket, or in the drive fit of the shaft in such hole, has resulted in production of a motor which is objectionable in the foregoing respects.

The present invention contemplates a procedure whereby the shaft is accurately positioned by an expanding mandrel directly from the field polar surfaces at opposite sides of the stator bore. The hole in the bracket is materially larger than the shaft in cross section. After the shaft is centered with precision on the axis of the cylindrical polar surfaces it is connected with the bracket by casting or molding a bonding insert to the shaft and to the bracket. The shaft is held in its precisely aligned and centered position until the cast material sets about it. Three types of material have been found appropriate for use in the casting operation. Any casting resin is usable, although less desirable at present because of the time required for set up. Type metal is also appropriate. However, the most satisfactory material found to date is conventional die casting zinc alloy.

Because the material which is cast about the end of the shaft to provide a bond between the shaft and the bracket does not fuse with the bracket, the hole in the bracket is non-circular, being provided with keys or integral splines or other irregularities to which the cast material may adhere. The cast material may actually be of identical composition with that of the bracket and still will not fuse thereto because the cast metal, in such a case, sets instantly upon contact with the previously cast bracket. Its mass is so small that its heat cannot soften the surface of the bracket. Moreover, any such cast material tends to shrink slightly upon setup. In view of the irregular surface of the bracket the cast material will securely position the shaft notwithstanding the slight shrinkage and lack of fusion. In addition, this lack of fusion has a very important and unexpected advantage in sound damping. The juncture between the bracket and the cast material in which the shaft is embedded provides a barrier against sound conduction.

Thus, not only does the structure and mode of manufacture as herein disclosed assure concentricity and squareness and rigidity, with resulting quietness, but even such minimum vibration as may occur is not transmitted to the stator frame of the motor. As a result, the motor is substantially entirely noiseless in operation.

The uniformity of air gap also improves constant torque performance, starting characteristics, bearing life and efficiency of operation.

In the drawings:
FIG. 1 is a view showing in axial section a motor embodying the invention.
FIG. 2 is a view in front elevation of the frame of a motor embodying the invention, the rotor being omitted.
FIG. 3 is a perspective view of the bracket which supports the armature shaft.
FIG. 4 is a diagrammatic view in axial section through the stator, the mandrel and the die shaft.
FIG. 5 is a fragmentary detail view taken in axial section on the line 5—5 of FIG. 4.

The magnet frame 6 is made conventionally of stator laminations which provide the polar portions 7 and 8. For strength, the laminations may be continuous about the stator bore but magnetic short circuiting is precluded by reducing the cross section at 9 and 10.

The winding 15 is formed on a separate core 16 dovetailed at its ends into the stator laminations of the frame 6.

The stator polar laminations are cylindrically finished at 17 to provide a stator bore 18 to receive the rotor 20. This rotor is mounted on a fixed shaft 25 supported from a bracket 26 which spans the stator bore. The bolts or rivets 28 extend through the laminations and the bracket and serve to maintain the frame in unitary assembly.

The prefabricated bracket 26 desirably comprises a die casting of non-magnetic metal such as zinc or type metal or an aluminum alloy. The material preferably used is known as die casting zinc alloy Zamak No. 3, also identified as SAE No. 903; government specification QQ–Z363. In composition, it is primarily zinc with aluminum 3.5 to 4.3 percent and magnesium 0.03 to 0.08 percent. Impurities should not materially exceed 0.1 percent maximum. Those found in test of a typical alloy are copper 0.007 percent; lead 0.005 percent; zinc 0.005 percent; and iron 0.100 percent.

Centrally the bracket has a boss 27 through which extends a non-circular opening 12. The surface of the bracket about the opening 12 is rough or irregular to provide an anchorage for the shaft-positioning metal cast in such opening as hereinafter described. In practice, the bridge member is die cast to provide anchorage lugs or ribs or splines such as those shown at 29 in FIGS. 3 and 4.

For the reasons previously noted, the armature bearing post or stationary shaft 25 is positioned directly from the cylindrical polar surfaces 17 of the stator bore 18, whereby no other assembly tolerance will in any manner affect its position. As one means of accomplishing this result, the shaft is temporarily positioned in a self-centering mandrel 30 which is inserted into the cylindrical stator bore to locate with precision the axis of such bore on which the shaft 25 is to be fixed. A set screw at 32 may be used to determine the axial position of the shaft 25 within the hole of mandrel 30. The end 33 of the shaft 25 may project slightly beyond the outer surface of the boss portion 27 of the bridge. The mandrel 30 may be provided with an annular terminal rib at 34 which seats on the inner side of the boss 27 of the bridge as a means of retaining in the opening 12 of the bridge the material to be cast therein to anchor the shaft. Thus the mandrel is also a part of the die assembly.

If the material is suitable for die casting, an external die 35 will desirably be applied as shown in FIG. 4 to embrace the outer side of the boss 27 of the bridge and to provide a cavity at 36 enclosing the end 33 of the shaft 25. A very small duct 37 is provided to place the interior of the die in communication with the conduit 38 from the pressure chamber in which the molten metal is stored for delivery to the die.

With the assembly completed as shown in FIG. 4, the material to be cast for the retention of the shaft 25 is delivered through conduit 38 and duct 37 into the chamber 36 of die 35 to flow into the non-circular opening 12 about the end of shaft 25 and about the ribs or irregularities 29 of the bracket 26. The duct 37 is so extremely small that the sprue breaks off when die 35 is removed, leaving no appreciable mark on the insert casting 40 which, as shown in FIG. 1 supports shaft 25 from bracket 26 in the precise position in which such shaft was located by the expanding mandrel directly from the cylindrical surfaces 17 of the stator. In other words, regardless of any irregularities in the form or mounting of the bracket, the shaft will always be located with precision in the exact center of the stator bore and in exact alignment with the axis of such bore.

As a result, the rotor will have precise concentricity and squareness with uniform air gap throughout. This will assure good starting torque in all rotor positions and constant torque performance in operation with substantially no vibration and excellent overall efficiency.

Not only is the rotor positioned with great precision but it is held with unusual rigidity on the desired axis of rotation. However, whether the imbedding material for the bearing post 25 is die cast or comprises a casting resin, in either case there is no fusion between the cast insert 40 and the frame of the stator, the anchorage being mechanical and the resulting joint providing a sound conduction barrier. The present invention does not deal with prevention of imbalance in the rotor but, even if imbalance is present and results in vibration, the vibration is largely confined to the shaft and transmission of vibration to and through the stator frame is minimized by this construction.

I claim:

1. A method of mounting a non-rotatable shaft within the cylindrical stator opening between the poles of an electric motor having a stator with such poles and having a rotor rotatable with respect to the shaft, such method including the steps of prefabricating a bracket with an aperture larger than said shaft and having a wall bounding said aperture which is provided with centrally converging surfaces for rigid connection with the insert hereafter mentioned, the assembly of laminations to comprise a stator frame having stator poles, cylindrically finishing the poles, assembling said bracket with the stator poles in a position spanning the opening, centering a shaft for the rotor with precision by means of a jig supported directly from the stator poles, with a portion of the shaft projecting into the aperture of the bracket, casting between the shaft and the bracket an insert of initially fluid material, contracting the material of the insert by the cooling of such material to wedge such material between the said centrally converging surfaces of the bracket and to shrink such material upon the shaft for the rigid mounting thereof while maintaining the shaft rigidly positioned from the jig until such material has set, and then removing the jig and leaving the shaft fixedly positioned from the bracket solely through such insert, the cast insert maintaining the shaft in precisely aligned position with respect to the cylindrically finished poles irrespective of tolerances in the bracket.

2. The method of claim 1 in which the prefabricating of the bracket comprises a die casting operation including the casting of portions of said bracket about the aperture as to provide circumferentially spaced lugs having the centrally converging surfaces aforesaid and defining sector-shaped spaces between said surfaces, thereby providing a key to maintain the cast insert in rigid connection with the bracket notwithstanding any shrinkage of the insert following the casting thereof within the bracket aperture.

3. The method of claim 2 including the step of positioning on the bracket a die having a cavity about the end of the shaft and provided with an inlet for molded metal, the said casting of the insert comprising a die casting operation involving the injection of metal into said cavity and about the end of the shaft, and followed by the removal of the die from the bracket to expose the cast insert.

References Cited by the Examiner

UNITED STATES PATENTS

| | | | |
|---|---|---|---|
| 598,540 | 2/98 | Soames | 29—155.5 |
| 2,060,260 | 11/36 | Spengler | 29—155.5 |
| 2,781,165 | 2/57 | Troller | 29—155.5 |
| 2,814,744 | 11/57 | Demetriou et al. | 310—42 |
| 2,904,709 | 9/59 | Lautner | 310—90 |
| 2,928,960 | 3/60 | Macks | 310—90 |

WHITMORE A. WILTZ, *Primary Examiner.*

JOHN F. CAMPBELL, *Examiner.*